US005972155A

United States Patent [19]

Coopride et al.

[11] Patent Number: 5,972,155

[45] Date of Patent: Oct. 26, 1999

[54] METHOD OF MAKING REPOSITIONABLE BLANK SIGNAGE SHEETS

[75] Inventors: Terry E. Cooprider, Woodbury; Dale O. Bailey, White Bear Lake; Lori A Bilski, Woodbury, all of Minn.; Jean-Philippe Weber, Dachstein, France

[73] Assignee: 3M Innovative Properties Company, St. Paul, Minn.

[21] Appl. No.: 08/926,904

[22] Filed: Sep. 10, 1997

Related U.S. Application Data

[60] Division of application No. 08/684,055, Jul. 22, 1996, abandoned, which is a continuation-in-part of application No. 08/632,176, Apr. 15, 1996, abandoned.

[51] Int. Cl.[6] .......................... B32B 31/10; B32B 31/12; B32B 31/18; G09F 3/10

[52] U.S. Cl. .......................... 156/269; 156/289; 156/299; 156/302; 156/324; 428/41.8

[58] Field of Search .................................... 156/289, 291, 156/269, 324, 299, 302; 428/41.7, 41.8; 40/594; 283/60.1, 81, 98, 100

[56] References Cited

U.S. PATENT DOCUMENTS

| | | | |
|---|---|---|---|
| H377 | 12/1987 | Greig | 281/2 |
| 2,095,437 | 10/1937 | Fox . | |
| 2,191,704 | 2/1940 | Bennett | 91/68 |
| 4,098,945 | 7/1978 | Oehmke | 428/327 |
| 4,214,024 | 7/1980 | Jacobson . | |
| 4,671,003 | 6/1987 | Vitol | 40/2 |
| 4,695,077 | 9/1987 | Pretre | 283/81 |
| 4,864,755 | 9/1989 | Owens | 40/594 |
| 4,882,211 | 11/1989 | McIntyre et al. | 428/40 |
| 4,884,826 | 12/1989 | Slagsvol | 281/2 |
| 4,889,754 | 12/1989 | Vargas | 428/41 |
| 4,895,747 | 1/1990 | Birkholz et al. | 428/42 |
| 4,940,258 | 7/1990 | Cuba, Jr. et al. | 283/81 |
| 4,944,888 | 7/1990 | Mallya et al. . | |
| 4,980,212 | 12/1990 | Marquis et al. . | |
| 5,215,818 | 6/1993 | Silver et al. . | |
| 5,267,899 | 12/1993 | Longtin | 462/7 |
| 5,290,067 | 3/1994 | Langen | 283/60.1 |
| 5,464,681 | 11/1995 | Luce | 428/195 |
| 5,466,502 | 11/1995 | Wilkinson et al. | 428/40 |
| 5,597,635 | 1/1997 | Pusl et al. | 283/81 X |
| 5,621,993 | 4/1997 | Stover . | |
| 5,667,618 | 9/1997 | Lowther | 156/324 X |
| 5,714,237 | 2/1998 | Cooprider et al. . | |

FOREIGN PATENT DOCUMENTS

| | | | |
|---|---|---|---|
| 0 739 964 A2 | 10/1996 | European Pat. Off. . |
| 9000841 | 4/1990 | Germany . |
| WO-A-9419420 | 9/1994 | WIPO . |
| 98/03958 | 1/1998 | WIPO . |

*Primary Examiner*—Curtis Mayes
*Attorney, Agent, or Firm*—Michaele A. Hakamaki

[57] ABSTRACT

A repositionable, adhesively mounted, blank signage sheet including (i) a sheet having imprintable first and second major surfaces which are essentially void of communicative indicia, (ii) repositionable adhesive strips disposed on the first major surface of the sheet along each of the margins, with each adhesive strip offset from the edge of the sheet so as to define adhesive-free tabs along the first and second edges of the sheet, and (iii) release liners covering the marginal adhesive strips.

13 Claims, 1 Drawing Sheet

METHOD OF MAKING REPOSITIONABLE BLANK SIGNAGE SHEETS

This is a divisional of U.S. patent application Ser. No. 08/684,055, filed Jul. 22, 1996, now abandoned, which is a continuation in part of U.S. patent application Ser. No. 08/632,176 filed Apr. 15, 1996, now abandoned.

FIELD OF THE INVENTION

The invention relates to signage sheets.

BACKGROUND

Businesses commonly prepare customized advertising signage on-site, which are then displayed by mounting the signage on a bulletin board or taping the signage to a window with adhesive tape. The use of such signage has expanded significantly in recent times due to the widespread prevalence of high quality computer printers capable of imprinting professional quality text and graphics on such signage.

While the quality of the text and graphics imprinted upon such signage has improved significantly, the mechanisms utilized to mount the signage for display has not changed much over the years. The most common mechanisms continue to be push-pins and lengths of adhesive tape pulled from a standard roll of office tape.

Accordingly, a substantial need exists for an improved mechanism for mounting such signage upon both transparent and opaque vertical surfaces which (i) does not interfere with the printing process, (ii) allows the signage to be repositioned, (iii) does not mark the surface upon which the signage is mounted, (iv) does not leave any residue, and (v) allows the signage to be mounted upon a variety of surfaces.

SUMMARY OF THE INVENTION

We have invented a simple, easy to use, repositionable, adhesively mounted, blank signage sheet which is compatible with copy machines and computer printers and provides extended hang time on a variety of surfaces from glass window panes to concrete blocks. The signage sheet includes (i) a sheet having imprintable first and second major surfaces which are essentially void of communicative indicia, (ii) repositionable adhesive strips disposed on the first major surface of the sheet along each of the margins, with each adhesive strip offset from the edge of the sheet so as to define adhesive-free tabs along the first and second edges of the sheet, and (iii) release liners covering the marginal adhesive strips. An adhesive free imprintable area is provided between the adhesive strips.

We have also invented a method of making our unique signage sheet and methods of making customized signs from our signage sheets and displaying such customized signs.

The method of making blank signage includes the steps of (i) conveying a continuous, imprintable, essentially blank web in a first direction, (ii) applying a repositionable adhesive along the side margins of the first major surface of the conveyed web so as to define marginal adhesive strips and an adhesive free imprintable area between the marginal adhesive strips on the first major surface; and (iii) applying release liner over the marginal adhesive strips as the web is conveyed in the first direction. The web may be either a true web fed from a continuous roll or a pseudo web of overlapped individual sheets. Alternatively, individual sheets may be separately processed in accordance with this method.

When a true web is used to manufacture the blank signage, the method further includes the step of transversely cutting the resultant continuous length of blank signage to form individual blank signage sheets.

When a pseudo web is used to manufacture the blank signage and a continuous length of release liner is applied to the pseudo web, the method further includes the step of transversely cutting the continuous length of release liner to allow separation of the individual blank signage sheets.

The method of creating customized signs includes the steps of obtaining one of our unique signage sheets as described above and then printing communicative indicia upon the imprintable area of the first and/or second major surfaces of the signage sheet.

The method of displaying the custom printed signage sheet includes the steps of removing the release liners to expose the marginal adhesive strips; and adhering the exposed adhesive strips to a mounting surface. When communicative indicia intended for display is printed upon the first major surface, the signage sheet should be adhered to a transparent mounting surface so that the printed communicative indicia will be viewable through the surface. Alternatively, when communicative indicia intended for display is printed only upon the second major surface, the signage sheet may be adhered to a transparent, translucent or opaque mounting surface since the printed communicative indicia need not be viewable through the surface.

DETAILED DESCRIPTION OF THE INVENTION INCLUDING BEST MODE

Definitions

Figure 1:
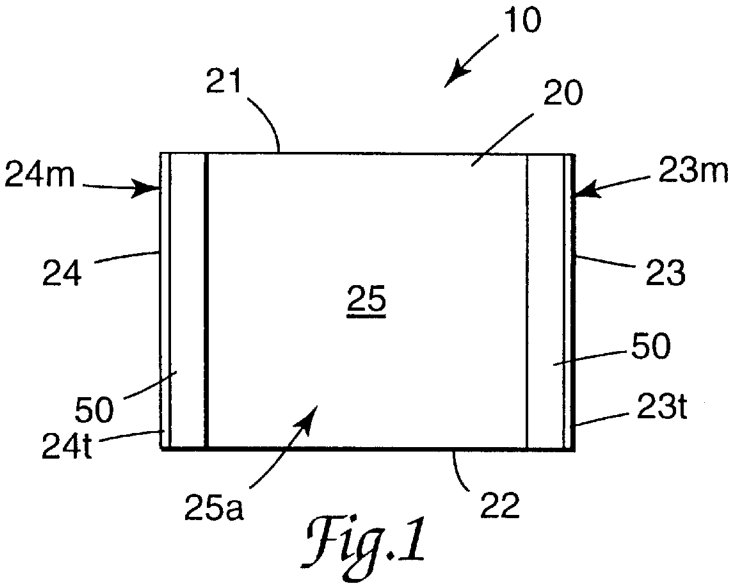
FIG. 1 is a top view of one embodiment of the signage sheet of invention.

The term "repositionable adhesive" is a term of art which is utilized herein in accordance with its standard industry meaning. Broadly, a repositionable adhesive is an adhesive which permits typical label and signage substrates, such as paper and polymeric films, to be repeatedly attached to and removed from various surfaces without significant loss in adhesive strength, without leaving adhesive residue upon the surface, and without destruction of the substrate.

As utilized herein, the term "computer printer" includes the various commercial, industrial and personal impact and nonimpact printers, other than those which require specially coated paper to produce the image (e.g., thermal transfer printers and dye sublimation printers), such as dot matrix, ink jet and laser jet printers.

As utilized herein, the term "imprintable" is utilized in its broadest sense to indicate a surface capable of accepting and retaining communicative indicia by one or more of the well-known means of producing such indicia, from handwriting to a Heidelberg press, utilizing any of the well-known imaging compositions ranging from aqueous-based dyes to electrostatic toners.

As utilized herein, the term "printing" is utilized in its broadest sense to include all of the well-known personal and commercial means of producing communicative indicia upon a substrate, including specifically, but not exclusively, handwriting, painting, printing on a computer printer, printing on a printing press, screen printing, xerographic copying, etc.

As utilized herein, the term "communicative indicia" means indicia which conveys information, including specifically, but not exclusively, letters ("X"), numbers ("40%"), words ("On Sale"), symbols ("α"), and designs ("The Triple Arrow Reduce/Reuse/Recycle Design").

As utilized herein, the term "design indicia" means ornamental or decorative indicia which does not convey information, including specifically, but not exclusively, a background pattern or color, and a decorative border.

As utilized herein, the phrase "roughly textured surface" means an uneven surface having various irregularities which results in a significant reduction in the surface area available for contacting the marginal adhesive strips 40 of a signage sheet 10 adhered to the surface. Surface which are typically "roughly textured surfaces" include specifically, but not exclusively: painted and unpainted brick and/or mortar, painted and unpainted cinder block and/or mortar, painted and unpainted concrete, textured drywall, cork board, woven and ribbed fabric, textured polymeric surfaces such as computer cabinets, refrigerator doors, and kitchen cabinets, painted and unpainted rock walls, textured vinyl wallpaper, and fabric wallpaper. Examples of surfaces which, unless intentionally textured to provide a rough surface, are generally not roughly textured surfaces include: surface laminated countertops such as Formica®, polished painted and unpainted metal surfaces such as metal automobile bodies and aluminum clad exterior doors, window glass panes, painted and unpainted wood, and varnished and unvarnished wood.

As utilized herein, the phrase "pseudo web of overlapped individual sheets" means a plurality of individual sheets wherein the trailing edge of each sheet overlaps or underlies the leading edge of a subsequent sheet so as to form a continuous line of individual sheets which can be processed as a normal continuous web since upper and lower rollers and other mechanisms in contact with the sheets are continuously separated by the pseudo web.

As utilized herein, the phrase "essentially void of communicative indicia" means that any communicative indicia is sized, positioned, shaded, colored and otherwise of such a nature as to avoid interfering with the printing, viewing and display of any primary communicative indicia printed upon the sheet by the end user, with such secondary indicia substantially inconspicuous to the intended audience of the primary communicative indicia. Examples of common communicative indicia which could be printed upon a major surface of a sheet while maintaining the status of the surface as "essentially void of communicative indicia" would include a water mark and a manufacturers label (i.e., "made by 3M") in 8 point type-font positioned along an edge of an A4 sized signage sheet.

Nomenclature

| | |
|---|---|
| 10 | Signage Sheet |
| 20 | Imprintable Substrate |
| 21 | Top Edge of Imprintable Substrate |
| 22 | Bottom Edge of Imprintable Substrate |
| 23 | Right Edge of Imprintable Substrate |
| 23m | Right Margin of Imprintable Substrate |
| 23t | Right Edge Tab |
| 24 | Left Edge of Imprintable Substrate |
| 24m | Left Margin of Imprintable Substrate |
| 24t | Left Edge Tab |
| 25 | First Major Surface of Imprintable Substrate |

-continued

| | |
|---|---|
| 25a | Imprintable Area of First Major Surface |
| 26 | Second Major Surface of Imprintable Substrate |
| 30 | Bleed-Resist Coating |
| 40 | Repositionable Adhesive |
| 50 | Release Liner |

Construction

The signage sheet 10 of our invention includes sequential layers of web 20, adhesive 40 and release liner 50 with the sheet 10 having in any desired shape including circles, triangles, squares, rectangles, trapezoids, pentagons, etc. However, since consumer preference and ease of manufacture generally dictate the production of rectangular signage sheets 10 the remainder of the discussion will be based upon a rectangular signage sheet 10.

Figure 2:
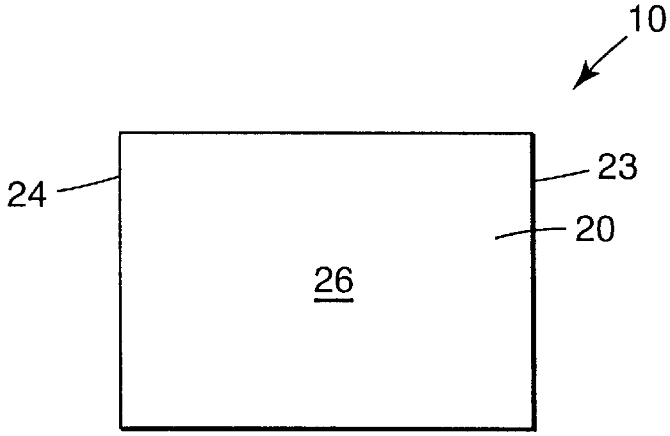
FIG. 2 is a bottom view of the signage sheet embodiment shown in FIG. 1.
Figure 3:
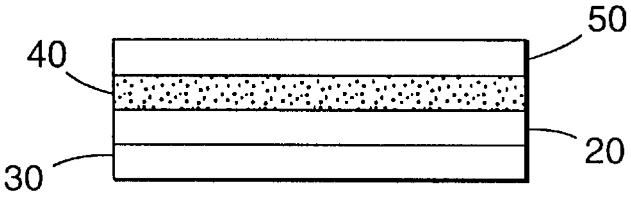
FIG. 3 is an enlarged side view of a portion of the signage sheet embodiment shown in FIG. 1 depicting the various layers of material disposed along the margins of the signage sheet.

As shown in FIGS. 1 and 2, the signage sheet 10 is based upon an imprintable substrate 20 having a top edge 21, a bottom edge 22, a right edge 23, a left edge 24, and first 25 and second 26 major surfaces. The major surfaces 25 and 26 are imprintable, but provided to an end user essentially void of communicative indicia (not shown) so that the end user may customize communicative indicia printed on the signage sheet 10 without interference from preprinted communicative indicia. Design indicia (not shown), such as a background pattern or a border, may be imprinted upon the first 25 and/or second 26 major surfaces as desired. When design indicia (not shown) is provided on both the first 25 and the second 26 major surfaces, the appearance of phantom images, caused by design indicia from one surface showing through to the other surface, may be prevented by (i) the use of standard bleed resist 30 and opaque (not shown) coatings, and/or (ii) printing the design indicia as mirror images.

The substrate 20 may be of substantially any size, with the lower limit dictated primarily by the need for sufficient space to imprint an appropriately sized communicative image (not shown) and the upper limit dictated primarily by limitations on the printing equipment to be used, as well as the ability to handle the signage sheet 10 and limitations on display space. As a practical matter, customer preference is for a rectangular signage sheet 10 of about 200 to 1,000 $cm^2$, preferably about 400 to 600 $cm^2$, and between about 5 to 100 cm wide by 5 to 100 cm long, preferably 15 to 25 cm wide and 20 to 40 cm long.

The substrate 20 may be constructed from any of the various opaque, transparent or translucent imprintable sheet materials known in the industry, including paper and polymeric films. Since the signage sheet 10 is designed to permit production of custom printed signage with communicative indicia (not shown) on one or both major surfaces 25 and 26 of the substrate 20, the substrate 20 is preferably constructed of an opaque material.

The right **23*m* and left 24*m* margins of the first major surface 25 are coated with a repositionable adhesive 40 along the entire length of the right 23*m* and left 24*m* margins so as to define marginal adhesive strips 40. While the repositionable adhesive 40 may be pattern coated or coated along less than the entire length of the margins 23*m* and 24*m*, such coating styles are not generally preferred due to the decreased adhesive strength provided by such incomplete marginal adhesive strips 40 and accompanying increase in the risk that the signage 10** will separate from a vertical mounting surface (not shown).

The adhesive strips 40 are offset from the right 23 and left 24 edges of the substrate 20 so as to define a right edge tab **23*t* and a left edge tab 24*t*** which is free of adhesive. The tabs 23*t* and 24*t* facilitate removal of the signage sheet 10 from a mounting surface (not shown) as they do not adhere to the mounting surface and can be grasped without having to delaminate a comer (unnumbered) of the sheet 10 from the mounting surface first. The tabs 23*t* and 24*t* preferably extend along the entire length of the substrate 10 and are provided along both the right 23 and left 24 edges so that a user need not search for the tab 23*t*, 24*t* when removing the signage 10 from a mounting surface (not shown). The tabs 23*t* and 24*t* are preferably about 0.5 to 2 cm wide. Tabs 23*t* and 24*t* of less than about 0.5 cm are difficult to grasp while tabs 23*t* and 24*t* of greater than about 2 cm wide are susceptible to curling, crumpling or other damage during use without a corresponding improvement in the ease with which the substrate 10 can be removed from a mounting surface (not shown).

The top (unnumbered) and bottom (unnumbered) margins of the first major surface 25 may also optionally be coated with a repositionable adhesive 40 so as to define top and bottom marginal adhesive strips (not shown). However, the addition of such top and bottom marginal adhesive strips (not shown) provides only limited advantages and is generally not preferred due to the detrimental side effects of (i) increased time and expense involved in manufacturing such signage sheets 10 due to the need to add the cross-directional top and bottom marginal adhesive strips (unnumbered) and accompanying release liners (not shown), (ii) increased time required to mount the signage sheet 10 due to the need to remove the additional top and bottom release liners (not shown) and, (iii) increased opportunity for the signage sheet 10 to warp, bubble or otherwise be distorted when applied to a mounting surface (not shown).

The width of the left and right marginal adhesive strips 40 must be sufficient to ensure that adequate adhesive strength is provided to prevent the loss of adhesion between the signage 10 and a mounting substrate (not shown). On the other hand, the width of the left and right marginal adhesive strips 40 should be limited to that width necessary to minimize the risk of adhesive failure in order to maximize the size of the adhesive free imprintable area 25*a* available for being printed with communicative indicia (not shown). While the optimal width of the marginal adhesive strips 40 depends upon a number of factors, such as the aggressiveness of the specific adhesive used, individual marginal adhesive strip widths of about $1/50^{th}$ to about $1/10^{th}$ of the total width of the substrate 20 generally provides a proper balance between the competing interests of ensuring prolonged adhesion of the signage 10 to a mounting substrate (not shown) and providing maximum imprintable adhesive free area 25*a*. Generally, a width of between about 0.5 cm to about 10 cm, preferably about 1 cm to about 4 cm, has been found to provide the desired balance when the preferred pressure sensitive microsphere adhesive described herein is utilized.

The adhesive strips 40 define an adhesive free imprintable area 25*a* on the first major surface 25 between the adhesive strips 40.

The repositionable adhesive 40 may be any of the well known repositionable adhesives disclosed in the literature, including any of the various microsphere-based repositionable adhesives, such as the revolutionary microsphere adhesive utilized to produce the famous Post-It® brand notes manufactured by Minnesota Mining and Manufacturing Company. Preferred repositionable adhesives 40 are those capable of allowing the marginal adhesive strips 40 to maintain an adhesive bond to roughly textured surfaces (not shown), at the adhesive surface area limitations set forth herein, for at least 30 days. A preferred repositionable adhesive 40, effective for providing such aggressive adhesion without sacrificing the other characteristics required of a repositionable adhesive composition comprises a blend of one or more microspheres and an adhesive binder comprising at least one acrylamide-based moiety. Preferably, the microspheres are polymeric, inherently tacky, elastomeric microspheres; and the binder is a pressure sensitive adhesive polymer having at least one acrylamide moiety, with the acrylamide moiety optionally copolymerized with one or more free radically polymerizable monomers, such as an acrylate or methacrylate. A detailed discussion of these types of adhesives is provided in WO 94/19420 published on Jan. 09, 1994.

Release liners 50 cover both the right and left adhesive strips 40 to prevent premature bonding of the repositionable adhesive 40. Alternatively, a single piece release liner (not shown), sized to cover both the right and left adhesive strips 40, may be used. However, the use of such a single piece release liner (not shown) to cover both adhesive strips 40 is not generally preferred because it must either (i) cover the adhesive-free imprintable area 25*a* of the first major surface 25, or (ii) require the manufacture, application and removal of a relatively expensive and awkward frame-shaped release liner.

The substrate 20 may optionally be coated with any of the well known bleed-resist coating materials 30 for the purpose of preventing an image (not shown) printed on one major surface from bleeding through the substrate 20 and onto the other surface. The substrate 20 may also optionally be coated with any of the well known high opacity value coating materials (not shown), such as titanium dioxide, for the purpose of preventing communicative and/or design indicia (not shown) printed on one major surface from showing through the substrate 20 and interfering with the appearance of any communicative and/or design indicia printed on the other surface.

Method of Making

The blank signage sheets 10 may be conveniently constructed by (i) conveying a continuous, imprintable, web (not shown) in a first direction, (ii) applying a repositionable adhesive 40 along the right 23*m* and left 24*m* margins of the first major surface 25 of the conveyed web so as to define marginal adhesive strips 40 and an adhesive free imprintable area 25*a* between the marginal adhesive strips 40 on the first major surface 25; and (iii) applying release liner 50, typically from a continuous roll (not shown), over the marginal adhesive strips 40 as the web is conveyed in the first direction. The web may be either a true web fed from a continuous roll or a pseudo web of overlapped individual sheets. Alternatively, individual sheets of imprintable substrate 20 may be separately processed in accordance with this method.

When a true web (not shown) is used to manufacture the signage sheets 10, the method further includes the step of transversely cutting the resultant continuous length of signage to form individual signage sheets 10.

When a pseudo web is used to manufacture the signage sheets 10, the release liner 50 must either be (i) cut to the proper length and properly registered with each individual sheet 10 when applied, or (ii) applied as a continuous length to the sheets 10 and then transversely cut so that the individual sheets 10 may be separated.

The repositionable adhesive 40 may be applied to the first major surface 25 of the substrate 20 by (i) directly coating the adhesive 40 onto the substrate 20, (ii) coating the adhesive 40 onto a transfer belt (not shown) with subsequent drying of the adhesive 40 and transfer of the dried adhesive film (not shown) from the transfer belt to the substrate 20, or (iii) coating the adhesive 40 onto a first major surface of a tape strip (not shown) and then adhering the tape strip to the substrate 20 with an aggressive adhesive (not shown) coated onto the second major surface of the tape strip.

When separate release liners 50 are applied over the left and right marginal adhesive strips 40 from continuous rolls (not shown), the rolls should be applied from independently rotatable mandrels (not shown). We have surprisingly discovered that, unless the rolls (not shown) of release liner 50 are started at precisely the same time and maintain exactly the same diameter throughout application of the entire roll (not shown), the rolls will be dispensed at different rates, causing one roll to be unwound and applied under insufficient tension.

Method of Using

Customized signs (not shown) may be quickly and conveniently producing using the signage sheets 10 by simply obtaining one of the signage sheets 10 and then printing communicative indicia (not shown) upon the imprintable area 25*a* of the first 25 and/or the second 26 major surfaces of the signage sheet 10. High quality printing can be quickly and inexpensively achieved by using a personal computer (not shown) to design the message and a computer printer (not shown) to print the message upon the signage sheet 10.

Once the communicative indicia (not shown) is printed upon the signage sheet 10, The signage sheet may be displayed by simply removing the release liners 50 so as to expose the marginal adhesive strips 40; and then adhering the exposed adhesive strips 40 to a mounting surface (not shown), including roughly textured surfaces, by simply applying hand-pressure to the adhesive strips 40. As mentioned previously, when communicative inidica (not shown) is printed upon the first major surface 25, the signage sheet 10 should be adhered to a transparent mounting surface (not shown) so that the printed communicative indicia will be viewable through the surface. Alternatively, when communicative inidica (not shown) is printed only upon the second major surface 26, the signage sheet 10 may be adhered to a transparent, translucent or opaque mounting surface (not shown) since the printed communicative indicia need not be viewable through the mounting surface.

The printed signage sheets 10 may most beneficially be adhered to the inside of store front windows (not shown) for display.

We claim:

1. A method of making blank signage, consisting essentially of:

(a) conveying a continuous imprintable web in a first direction, wherein the web has (i) imprintable first and second major surfaces which are essentially void of communicative indicia, and (ii) first and second side margins;

(b) applying a repositionable adhesive along the side margins of the first major surface of the conveyed web so as to define marginal adhesive strips having an exposed surface and an adhesive free imprintable area between the marginal adhesive strips on the first major surface; and (c) applying separate release liners over the exposed first surface of each of the marginal adhesive strips, as the web is conveyed in the first direction, to form blank signage having sequential layers of web, adhesive strip and release liner.

2. The method of claim 1 wherein the release liners are applied over each of the marginal adhesive strips from separate continuous rolls of release liner which are dispensed from independently rotatable mandrels.

3. The method of claim 1 wherein the blank signage is a continuous length of blank signage and the method further includes transversely cutting the continuous length of blank signage to form individual blank signage sheets.

4. The method of claim 3 wherein the continuous length of blank signage is transversely cut to form sheets which are rectangular in shape and about 15 to 25 cm by 20 to 40 cm.

5. The method of claim 1 wherein application of a repositionable adhesive composition comprises application of a repositionable adhesive comprising a blend of polymeric elastomeric microspheres and a pressure sensitive adhesive binder.

6. The method of claim 1 wherein the repositionable adhesive is applied so as to form marginal adhesive strips which extend substantially continuously along the entire length of the margins and are independently about 1 cm to about 4 cm wide.

7. A method of making blank signage, consisting essentially of:

(a) conveying a continuous imprintable opaque web in a first direction, wherein the web has (i) inprintable first and second major surfaces which are essentially void of communicative indicia, (ii) first and second opposite side edges, and (iii) first and second side margins extending along the opposite side edges;

(b) applying a repositionable adhesive along the side margins of the first major surface of the conveyed web with an offset from the respective side edge of the sheet, so as to define (i) adhesive-free tabs along the edges of the sheet, (ii) marginal adhesive strips extending along the edge tabs, and (iii) an adhesive free imprintable area between the marginal adhesive strips; and (c) applying separate release liners over each of the marginal adhesive strips, as the web is conveyed in the first direction, to form blank signage.

8. The method of claim 7 wherein application of a repositionable adhesive composition comprises application of a repositionable adhesive comprising a blend of polymeric elastomeric microspheres and a pressure sensitive adhesive binder.

9. The method of claim 7 wherein the repositionable adhesive is applied so as to form (i) marginal adhesive strips which extend substantially continuously along the entire length of the margins and are independently about 1 cm to about 4 cm wide, and (ii) adhesive-free tabs which extend substantially continuously along the entire length of the margins and are independently about 0.5 cm to about 2 cm wide.

10. A method of making blank signage, consisting essentially of:

(a) conveying an opaque sheet in a first direction, wherein the sheet has (i) imprintable first and second major surfaces which are essentially void of communicative indicia, (ii) first and second opposite side edges, and (iii) first and second side margins extending along the opposite side edges;

(b) applying a repositionable adhesive along the side margins of the first major surface of the conveyed sheet with an offset from the respective side edge of the sheet, so as to define (i) adhesive-free tabs along the edges of the sheet, (ii) marginal adhesive strips extending along the edge tabs, and (iii) an adhesive free imprintable area between the marginal adhesive strips; and (c) applying separate release liners over each of the marginal adhesive strips, as the sheet is conveyed in the first direction, to form blank signage.

11. The method of claim 10 wherein application of a repositionable adhesive comprises application of a repositionable adhesive comprising a blend of polymeric elastomeric microspheres and a pressure sensitive adhesive binder.

12. The method of claim 10 wherein the repositionable adhesive composition is applied so as to form marginal adhesive strips which extend substantially continuously along the entire length of the margins and are independently about 1 cm to about 4 cm wide.

13. The method of claim 10 wherein the repositionable adhesive is applied so as to form (i) marginal adhesive strips which extend substantially continuously along the entire length of the margins and are independently about 1 cm to about 4 cm wide, and (ii) adhesive-free tabs which extend substantially continuously along the entire length of the margins and are independently about 0.5 cm to about 2 cm wide.

* * * * *